(12) United States Patent
Borran et al.

(10) Patent No.: US 7,889,804 B2
(45) Date of Patent: Feb. 15, 2011

(54) PARTIALLY COHERENT CONSTELLATIONS FOR MULTIPLE-ANTENNA SYSTEMS

(76) Inventors: Mohammad Jaber Borran, 9837 N. Macarthur Blvd., #1604, Irving, TX (US) 75063; Ashutosh Sabharwal, 7510 Brompton St, #642, Houston, TX (US) 77025; Behnaam Aazhang, 3812 Marlowe, Houston, TX (US) 77005; Prabodh Varshney, 510 Westminster Way, Coppell, TX (US) 75019

( * ) Notice: Subject to any disclaimer, the term of this patent is extended or adjusted under 35 U.S.C. 154(b) by 209 days.

(21) Appl. No.: 10/671,346

(22) Filed: Sep. 24, 2003

(65) Prior Publication Data

US 2004/0240577 A1    Dec. 2, 2004

Related U.S. Application Data

(60) Provisional application No. 60/474,476, filed on May 30, 2003.

(51) Int. Cl.
   *H04B 7/02* (2006.01)
(52) U.S. Cl. .................................................. 375/267
(58) Field of Classification Search ........... 375/259, 375/267, 316, 346, 347
   See application file for complete search history.

(56) References Cited

U.S. PATENT DOCUMENTS

| | | | | |
|---|---|---|---|---|
| 4,866,395 A | * | 9/1989 | Hostetter | ..................... 329/309 |
| 4,891,823 A | * | 1/1990 | Cole | ......................... 375/242 |
| 5,007,047 A | | 4/1991 | Sridhar et al. | |
| 5,267,021 A | | 11/1993 | Ramchandran et al. | ..... 348/469 |
| 5,329,552 A | * | 7/1994 | de Couasnon et al. | ....... 375/295 |
| 5,537,430 A | | 7/1996 | Park et al. | ................... 714/792 |
| 5,822,371 A | | 10/1998 | Goldstein et al. | ........... 375/242 |
| 5,828,695 A | | 10/1998 | Webb | |
| 6,023,493 A | * | 2/2000 | Olafsson | ..................... 375/354 |
| 6,081,555 A | | 6/2000 | Olafsson | ..................... 375/242 |
| 6,097,764 A | | 8/2000 | McCallister et al. | ........ 375/298 |

(Continued)

FOREIGN PATENT DOCUMENTS

EP    1324558    7/2003

(Continued)

OTHER PUBLICATIONS

Borran et al, "On Design Criteria and Construction of Non-coherent Space-Time Constellations", pp. 1-6, http://www.ece.rice.edu/~ashu/publications /BSAJ02.pdf.*

(Continued)

*Primary Examiner*—Kevin M Burd

(57) ABSTRACT

A signal constellation for a multiple input/multiple output (MIMO) communication system when channel knowledge at the receiver is imperfect includes at least two (n−1)-dimensional sub-constellations of points that together form an n-dimensional constellation, the number n representing real dimensions and n=2M where M is the number of transmit antennas. The n-dimensional spherical constellation may define a single sphere or a plurality of concentric subset spheres, and points between subsets are separated by a Kullback-Leibler distance rather than a Euclidian distance. Each sphere has sub-constellations that preferably are arranged in symmetric pairs that define equal numbers of points that lie in parallel planes, to allow recursive construction that minimizes computational complexity. An appropriate constellation may be chosen by ceasing a search once the optimum minimum distance stops increasing as a number of the concentric levels increases.

34 Claims, 9 Drawing Sheets

U.S. PATENT DOCUMENTS

| | | | |
|---|---|---|---|
| 6,226,334 B1 | 5/2001 | Olafsson | |
| 6,373,832 B1* | 4/2002 | Huang et al. | 370/342 |
| 6,560,445 B1* | 5/2003 | Fette et al. | 455/91 |
| 6,654,431 B1 | 11/2003 | Barton et al. | |
| 6,674,820 B1 | 1/2004 | Hui et al. | |
| 6,915,477 B2 | 7/2005 | Gollamudi et al. | |
| 7,006,578 B2* | 2/2006 | Walker et al. | 375/261 |
| 7,016,296 B2 | 3/2006 | Hartman, Jr. | |
| 7,076,000 B2 | 7/2006 | Rodriguez | |
| 7,088,784 B2* | 8/2006 | Borran et al. | 375/264 |
| 7,149,239 B2 | 12/2006 | Hudson | |
| 7,173,973 B2 | 2/2007 | Borran et al. | |
| 7,269,436 B2* | 9/2007 | Won | 455/522 |
| 7,505,788 B1* | 3/2009 | Narasimhan | 455/562.1 |
| 2001/0017900 A1* | 8/2001 | Schelstraete | 375/265 |
| 2001/0031019 A1* | 10/2001 | Jafarkhani et al. | 375/267 |
| 2002/0090035 A1 | 7/2002 | Seshadri et al. | |
| 2002/0114378 A1 | 8/2002 | Yue | 375/136 |
| 2003/0076797 A1* | 4/2003 | Lozano | 370/334 |
| 2003/0076889 A1 | 4/2003 | Walker et al. | 375/261 |
| 2003/0123877 A1* | 7/2003 | Lo | 398/34 |
| 2003/0210824 A1* | 11/2003 | Falzon et al. | 382/240 |
| 2004/0100897 A1 | 5/2004 | Shattil | |
| 2005/0094740 A1 | 5/2005 | Borran et al. | 374/267 |
| 2006/0209982 A1* | 9/2006 | De Gaudenzi et al. | 375/279 |

FOREIGN PATENT DOCUMENTS

| | | |
|---|---|---|
| KR | 2002-0076049 | 10/2002 |
| RU | 2145152 | 1/2000 |
| RU | 2192094 | 10/2002 |

OTHER PUBLICATIONS

Borran et al. "On Design Criteria and Construction of Non-coherent Space-Time Constellations". pages 1-6, http://scholarship.rice.edu/bitstream/handle/1911/19742/Bor2002Jul5OnDesignCr.PDF?sequence=1 .Jul. 2002.*

Rice Digital Scholarship Archieve information regarding Borran et al document.*

Dabak et al "Signal Constellations for Non-Gaussian Communication problems" Statistical Signal and Array Processing. Minneapolis, Apr. 27-30, 1993. Proceedings of the International Conference on Acoustics, Speech, and signal Processing (ICASSP), New York, IEEE, US, vol. 4, pp. 33-36.*

Chan, Albert M., et al., "A New Reduced-Complexity Sphere Decoder for Multiple Anetenna Systems", Proc. Int. Conf. Commun. (ICC-02) (New York City) Apr. 2002.

Cover, T.M. and Thomas, J. A., "Elements of Information Theory", Wiley Interscience, 1991, p. 231.

Borran, et al., "Partially Coherent Constellations for Multiple-Antenna Systems", $37^{th}$ Asilomar Conference on Signals, Systems & Computers, Sep. 5, 2003.

Borran et al., "Constellations for Imperfect Channel State Information at the Receiver", $40^{th}$ Annual Allerton Conference on Communication, Control, and Computing, Oct. 2002.

Borran, et al., "Constellations for Imperfect Channel State Information at the Receiver, Rice University power point presentation", Oct. 2002.

International Search Report for PCT/IB2004/01566 mailed Feb. 8, 2005.

Translation of Decision on Grant for Russian Patent Application No. 2005141578, received Apr. 19, 2007.

Office Action from Korean Intellectual Property Office for corresponding Korean Application No. 10-2008-7015598, dated Aug. 21, 2008.

International Preliminary Examination Report for PCT/IB03/02088, completed Mar. 21, 2004.

International Search Report for PCT/IB03/02088 mailed, Oct. 23, 2003.

Lexa, M., "Useful Facts About the Kullback-Leibler Discrimination Distance," URL:http://www.ece.rice.edu{amlexa/publications/kl_properties.pdf), Jun. 9, 2005, 11 pgs.

Soon-Ghee Chua et al: "Variable-rate variable-power MQAM for fading channels" Vehicular Technology Conference, 1996. Mobile Technology for the Human Race., IEEE 46th Atalanta, GA, USA Apr. 28-May 1, 1996, New York, NY, USA, IEEE, US, 2:815-819, Apr. 28, 1996, XP010162502. ISBN: 0/7803-3157-5.

Supplementary European Search Report for EP 03 73 5862, dated Jun. 9, 2005.

Tarokh et al. "Space-Time Codes for High Data Rate Wireless Communication: Performance Criterion and Code Construction." Information Theory, IEEE Transactions, 44(2)744-765, Mar. 1998.

Supplementary European Search Report for EP 04 75 5820, dated Feb. 16, 2009.

Aazhang B et al, "On Design Criteria and Construction of Noncoherent Space Time Constellations", IEEE Transactions on Information Theory, US, 49(10):2332-2351, Oct. 1, 2003.

International Search Report and Written Opinion for PCT/US2004/19909, mailed Dec. 14, 2005.

International Preliminary Report on Patentability for PCT/US2004/019909, issued Jan. 3, 2006.

Office Action from Chinese Patent Office for related Chinese Application No. 200480017820.6, dated Oct. 31, 2008.

Office Action from Chinese Patent Office for related Chinese Application No. 200480022380.3, dated Mar. 6, 2009.

EP Communication for EP 04 755 820.0-1525, dated May 19, 2009.

Office Action on U.S. Appl. No. 10/523,167, mailed Jul. 10, 2009.

Office Action on U.S. Appl. No. 10/523,167, mailed Oct. 15, 2009.

Office Action for Chinese Application 200480022380.3 (English Translation), issued Nov. 27, 2009.

* cited by examiner

PARTIALLY COHERENT CONSTELLATIONS FOR MULTIPLE-ANTENNA SYSTEMS

PRIORITY STATEMENT

This application claims priority to U.S. Provisional Patent Application Ser. No. 60/474,476, filed on May 30, 2003, and which is herein incorporated by reference in its entirety.

TECHNICAL FIELD

This invention relates generally to design criteria and construction for signal constellations to be used in systems with imperfect channel state information at the receiver (partially coherent). More particularly, this invention relates to using multiple-antenna vector constellations and design criterion based on the Kullback-Leibler distance between conditional distributions.

BACKGROUND

Wireless communication systems serving stationary and mobile wireless subscribers are currently in wide use and are very popular with consumers. Numerous system layouts and communications protocols have been developed to provide coverage in such wireless communication systems.

The wireless communications channels between the transmit device, or transmission unit, (transmitter) and receive device, or receiver unit, (receiver) are inherently variable. Thus, their quality parameters fluctuate in time. Under favorable conditions, wireless channels exhibit good communication parameters, e.g., large data capacity, high signal quality, high spectral efficiency and throughput. Under these favorable conditions, significant amounts of data can be transmitted via the channel reliably. However, as the channel changes in time, the communication parameters also change. Under altered conditions, former data rates, coding techniques and data formats may no longer be possible. For example, when the channel performance is degraded, the transmitted data may experience excessive corruption yielding unacceptable communication parameters. For instance, transmitted data can exhibit excessive bit-error rates or packet error rates. The degradation of the channel can be due to a multitude of factors such as general noise in the channel, multi-path fading, loss of line-of-sight path, excessive Co-Channel Interference (CCI) and other factors.

In mobile communications systems, a variety of factors may cause signal degradation and corruption. These include interference from other cellular users within or near a particular cell. Another source of signal degradation is multipath fading, wherein the received amplitude and phase of a signal varies over time. Channel state information at the receiver is usually obtained through a training sequence to offset channel degradation. However, training sequences are an expensive commodity when bandwidth is in demand, because they are typically recurring transmission overhead that does not communicate data that is useful to the end users of the communication system. Limiting or eliminating training sequences necessarily frees bandwidth for other uses.

It has been shown that in a Rayleigh flat-fading environment, the capacity of a multiple-input/multiple-output (MIMO) communication system is increased as compared to a communication system using a single transmit and a single receive antenna. This is because multipath communication offers advantages that can be exploited to increase data rates. Specifically, data capacity increases linearly with the smaller of the number of transmit and receive antennas, provided that the fading coefficients for the multiple sub-channels between transmit and receive antennas are known at the receiver. In a slowly fading channel, where the fading coefficients remain approximately constant for many symbol intervals, the transmitter can send training signals that allow the receiver to accurately estimate the fading coefficients.

In practice, due to the necessarily finite length of the training sequence, there will always be some errors in the channel estimates. In order to maintain a given data rate, more rapidly fading channels would result in shorter training sequences, all other parameters being equal. This is because the data desired by a user would crowd out the training sequence, resulting in even less reliable channel estimates. Employing multiple transmit antennas compounds the above problem by requiring longer training sequences for the same estimation performance, since there are more sub-channels to estimate.

A typical assumption in designing optimal codes and signal constellations is known channel parameters at the receiver. That assumption is especially inappropriate in communication systems with multiple transmit antennas. For fast fading channels where the fading coefficients vary too fast to allow a long training period, or for MIMO systems where very long training sequences are required to accurately train all of the possible channels from the transmitter to the receiver, obtaining an accurate estimate of the channel at the receiver may not always be possible. For the above situations where only a rough estimate of the channel state is available at the receiver, existing signal constellations (e.g. PSK, QAM) and multiple-antenna techniques (e.g., V-BLAST, orthogonal transmit diversity), are no longer optimal because they are designed with the assumption of perfect channel state information at the receiver.

In the presence of channel estimation errors (partially coherent systems), signal constellations which are designed using the statistics of the estimation error are more desirable than those designed for perfect channel state information at the receiver.

Currently, PSK (phase shift key) signal constellations are sometimes used in the case of unreliable channel estimates at the receiver for a single antenna system, because PSK constellations are not sensitive to the errors in the estimates of channel amplitude. However, PSK constellations exhibit poor performance for high rate applications, which require larger signal sets. For a multiple antenna system, conventional constellations (PSK or QAM) are sometimes used in conjunction with some multiple-antenna technique such as V-BLAST or transmit diversity. However, theses approaches assume perfect channel state information at the receiver, which is often an invalid assumption as described above. MIMO communication systems using conventional constellations consequently suffer severe performance degradation in the presence of estimation errors as low as a few percent.

What is needed in the art is a new type of signal constellation tailored for the unique challenges of a communication system using multiple transmit and/or multiple receive antennas. Such a constellation system would require short or no training sequences, yet provide acceptable error rates despite imperfect channel state knowledge at the receiver. Ideally, advancement in the art is best served by a technique for designing such a signal constellation to facilitate further refinements.

SUMMARY OF THE PREFERRED EMBODIMENTS

This invention describes the use of multiple-antenna vector constellations that are optimally designed with the consideration of errors in the channel estimate, to overcome the above-mentioned problems.

This invention describes a design technique for constellations used in a MIMO system when a receiver has only an imperfect estimate of the channel parameters. Such constellations show significant performance improvement over the conventional constellations and MIMO techniques. Also shown is a recursive design technique for the spherical constellations that may be used as subsets of the partially coherent constellations.

The constellations of this invention exploit the statistics of the fading and estimation error, to jointly design constellations for MIMO systems. They use a design metric that is derived for the partially coherent scenarios (as opposed to using the conventional Euclidean design metric which is optimal only when receiver has perfect knowledge of the channel). As a result, they provide substantial performance gains over the conventional techniques in the presence of channel estimation errors as low as a few percent.

In accordance with one aspect of the present invention is an n-dimensional space-time signal constellation for use in a multiple-input/multiple-output (MIMO) communication system. The n dimensions are real as opposed to complex. The constellation system may be embodied in or on an electronic, optical, and/or electro-optical storage media. The constellation includes a plurality of constellation points. Each point is disposed within only one and only one of at least two (n−1)-dimensional sub-constellations, wherein n=2M and M is an integer greater than one. Preferably, M is the number of transmit antennas used to send a signal decoded by the n dimensional signal constellation.

The sub-constellations preferably include at least one pair of sub-constellations. Designating the pair of sub-constellations as A and B, for example, the invention preferably provides that each of A and B each defines the same number of points x, and both A and B are disposed symmetrically with respect to each other about an origin of the constellation. In certain instances, the constellation system may include another sub-constellation that defines a maximum number of points y (i.e., more than any other sub-constellation), and is not paired as A and B above. Preferably, each sub-constellation defines a plane that is parallel to all other planes defined by the other sub-constellations.

Additionally, the plurality of points may be dispersed among K subsets, in which case the above characterization of sub-constellations holds for sub-constellations within the same subset. K is an integer greater than one, and preferably the subsets define concentric spheres. Where subsets are present, the nearest distance between points in adjacent subsets is preferably a maximized minimum Kullback-Leibler distance.

In accordance with another aspect of the present invention is a symbol detection method for a receiver of a MIMO communication system. This method includes receiving a multipath signal from M transmit antennas, where M is an integer greater than one. From the received signal, data samples are obtained. The data samples are then fitted to at least one point of an n-dimensional real signal constellation, wherein n=2M. Preferably, the signal constellation is as described above.

In a preferred embodiment of the method above, fitting the data sample to points is accomplished by recursively comparing the data sample to points of sub-constellations within subsets until the data sample is matched to a constellation point. The data sample may be deemed matched once a distance between the constellation point and the data sample diverge as compared to the distance between a previous constellation point and the data sample. In certain embodiments, it may be advantageous to store more than one signal constellation, and selecting which one to use based on the receiver's determination of the number of transmit antennas M that were used to send the communication, or based on a ratio of signal power to noise power of the received signal.

Another aspect of the present invention is a wireless communications system network element such as, for example, a portion of a mobile station, a base station, a receiver symbol detector, and a symbol modulator. The network element includes storage means for storing a digital representation of at least one n-dimensional signal constellation defining a plurality of points. Again, the n dimensions are real dimensions, and n=2M, M being an integer greater than one. Each and every on of the plurality of points lies within one and only one of at least two (n−1)-dimensional sub-constellations of points. The sub-constellations may include at least one pair of sub-constellations each defining the same number of x points, the pair being symmetrically disposed about a geometric center or origin of the constellation.

In any of the above, the constellation need not be stored as a physical or geometric body, but rather is preferably stored as an algorithm or mathematical representation of points disposed as above and as further described herein.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
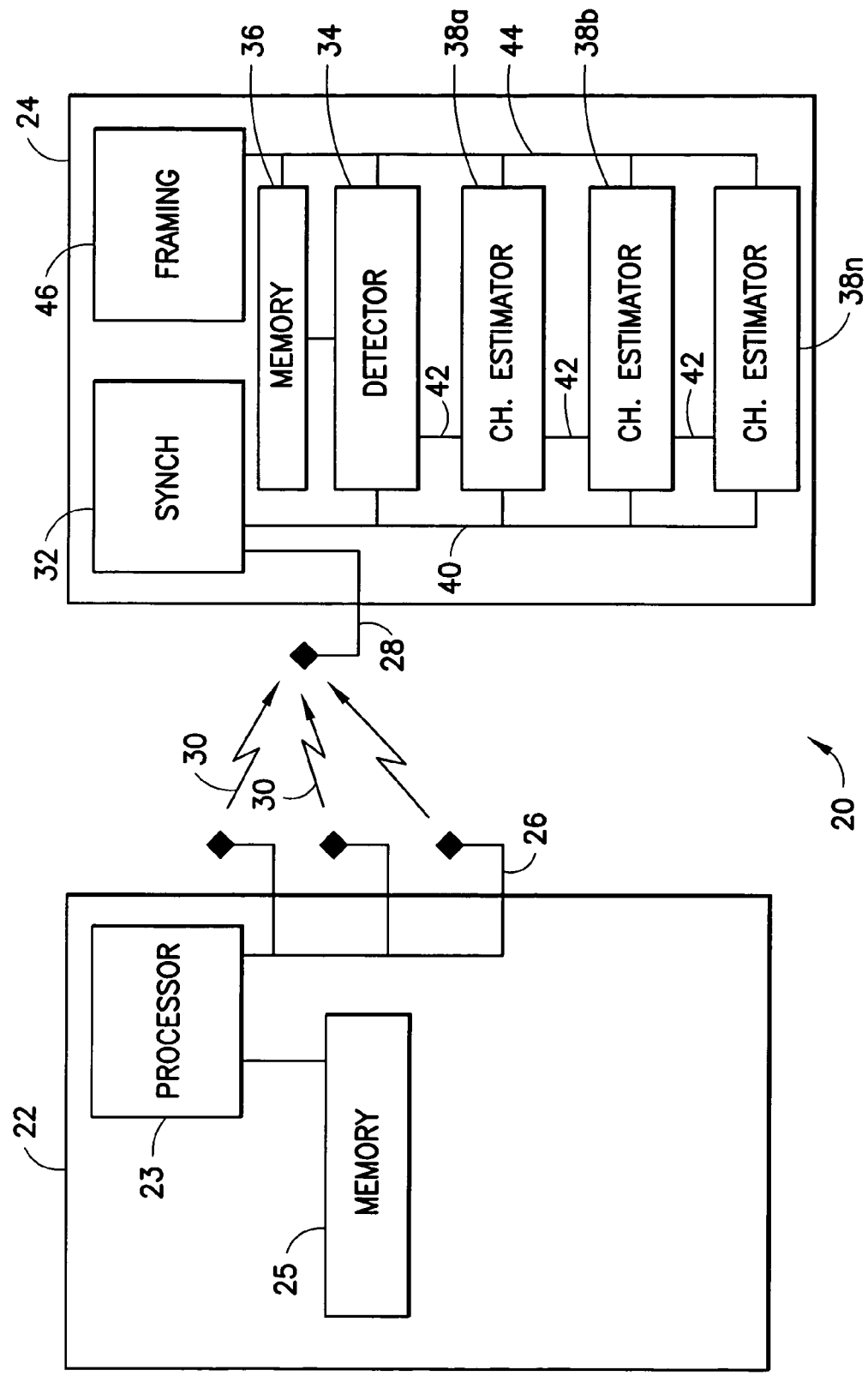
FIG. 1 is a block diagram of a wireless communication system with multiple transmit antennas employing a constellation of the present invention.

The inventors herein have set forth a design criterion for partially coherent signal constellations that is based on the Kullback-Leibler (KL) distance between conditional distributions. Several single transmit antenna constellations have also been designed by the present inventors, which have been shown to have better performance as compared to conventional constellations. These are described in a paper, herein incorporated by reference, entitled CONSTELLATIONS FOR IMPERFECT CHANNEL STATE INFORMATION AT THE RECEIVER by M. J. Borran, A. Sabharwal, and B. Aazhang, published in the *Proceed-* ings of the 40th Annual Allerton Conference on Communications, Control, and Computing, Monticello, Ill., October 2002.

A space-time matrix constellation that is optimally designed with the considers errors in the channel estimate to improve receiver performance in the presence of imperfect channel state information at the receiver. A channel is typically either RF or voice, for transmitting electrical signals between a sending point and a receiving point. Channels are often measured in terms of the amount of spectrum they occupy (bandwidth). Constellations are, for example, graphical representations of signal states for a digital system. Selected phase-amplitude pairs are referred to as constellation points. Constellations of the present invention exploit the statistics of the fading to encode additional information in the amplitudes of the transmit signals (as opposed to the PSK constellations in which all of the constellation points have the same amplitude). This allows for additional points in the constellation (higher rate) with a given peak power. In accordance with the teachings of this invention, and assuming the existence of a given signal-to-noise ratio and estimation variance, a multi-level constellation of desired size is designed using a design criteria based on the Kullback-Leibler (KL) distance between conditional distributions.

When a signal is being received, it has to be demodulated in order for the information therein to be detected. However, a signal transferred over the radio path can be distorted in various ways, thus complicating modulation detection. Signal-impairing phenomena include, e.g., noise and inter-symbol interference (ISI). A signal-distorting phenomenon also arises when a signal on a radio connection is reflected from various obstacles, such as buildings and irregularities in the terrain. In this case, the signal detected at a receiver is the sum of a plurality of propagation paths. Each propagation path is different in length, and signals arrive at the receiver at different points of time, i.e. the delay varies. In addition, the movement of a vehicle causes frequency deviations in relation to speed, the deviations being called Doppler frequencies.

One type of modulation that may be used is π/4-DQPSK (π/4-shifted Differential Quaternary Phase Shift Keying modulation). This modulation method comprises eight phase states, but only four phase shifts. Allowed phase shifts (symbols) are +/− π/4 and +/−3π/4. In practice, the π/4-DQPSK constellation varies at intervals of a symbol between two 4-point constellations. Non-idealities of a channel may cause constellation points to shift.

It is typical of the radio path that a transmitted signal arrives at a receiver along a plurality of propagation paths, each having a specific time delay. Channel properties also change as a function of time. For example, beams reflected and delayed on the radio path cause inter-symbol interference (ISI). The frequency response, or impulse response, of a channel can be estimated by the use of a discrete-timed filter channel estimator, whose filter tap coefficients model the radio channel. Such a channel estimator is used to describe the state of a radio channel, and refers generally to a mechanism for estimating and maintaining a description of the complex impulse response of a radio channel.

FIG. 1 shows a communication system 20 that may be used with the present invention including a transmitter 22 and a receiver 24. Typically, each unit 22 and 24 is a transceiver, but are discussed separately herein for simplicity. The transmitter 22 includes a signal processor 23 coupled to a memory 25 for storing a constellation according to the present invention. The transmitter 22 also includes a number M of transmit antennas 26, M=3 as shown. The receiver includes a number of N receive antennas 28, N=1 as shown. At least one of the integers N or M is greater than one to constitute a MIMO communication system. The receiver 22 is typically part of a cellular telephone, which has sufficient memory to store signal constellations as look-up tables, algorithms, or combinations thereof, in the telephone handset, or that may retrieve signal constellations that are stored at a transmitter location, such as a base unit location, or, in general, that are stored in any memory that is accessible via a wireless network. The receiver 22 may be used in many cellular telephone applications, one non-limiting example being a cdma2000 cellular telephone system (or evolutions thereof). Upon reception, a signal is received from a transmitter antenna 26 over a channel 30 to a receiver antenna 28 and radio-frequency components, such as a demodulator (not shown), process the signal. Samples are then taken with an A/D converter (not shown) from an intermediate-frequency signal. The samples are applied to a synchronization module, or unit, 32. The synchronization module 32 searches the obtained samples for the training sequence associated with the frame structure and uses it to accurately determine the sampling moment, i.e. locations of all symbols in the sample flow. The synchronization module 32 also controls the radio-frequency components of the receiver so as to maintain a signal arriving at the A/D converter at an optimal level. The synchronization module 32 applies the frame to a channel detector module, or unit, 34.

When information is transferred on a radio channel 30, the signal to be transmitted has to be subjected to modulation. Modulation converts the signal into a form in which it can be transmitted at radio frequency. A modulation method can be considered efficient, for instance, if it allows as much information as possible to be transferred using as narrow a frequency band as possible. Depending on the purpose of use, other features can also be emphasized. Modulation should also cause as little interference as possible to adjacent channels. The channel detector module 34 includes, or is suitably coupled to, a memory 36.

The detector module 34 is coupled to at least one adaptive channel estimator module or unit 38(a) ... (n), where n is any suitable integer number. The channel estimators 38 receive input from the synchronization module 32 via associated interconnectors 40, respectively. Interconnectors 40 are typically wires, or wireless transmission means that are adapted to transmit data. The detector module 32 receives as inputs, outputs from the channel estimators 38, via associated interconnectors 42. Detector module 34 outputs information to estimator modules 38, via associated interconnectors 44. Interconnectors 42 and 44 are similar to interconnectors 40 described herein. Detector module 34 utilizes an algorithm or stored program to demodulate the received signal and compare the demodulated signal to one or more space-time matrix signal constellations, which are typically stored in a memory 36 as a look-up table, an algorithm, or a combination thereof, and preferably stored in the mobile phone handset (also referred to as a mobile station, such as a cellular telephone), but alternatively at a transmitter 22, at a base station, or at any other location that is accessible via a wireless network. A logical channel 30 is formed from the framing unit 46.

An example of the general structure of a receiver 22 has been described to facilitate understanding the present invention. However, the structure of the receiver 22 may change without deviating from the present invention, which is directed to a channel equalizer/detector of a receiver.

It should be noted that the performance gain realized by the present invention becomes substantial as the number of transmit and/or receive antennas 26, 28 increases. A significant improvement in performance is also achieved when the improved signal constellations are used in conjunction with an outer error correcting code. For example, the outer code may be a block or a trellis code designed to encode several signal matrices across time. By designing the outer code based on the Kullback-Leibler (KL) distance criterion, the minimum distance between coded blocks can be further increased, leading to improved error rate performance.

Design criterion is derived for the very general case of matrix constellations (to be used with MIMO systems over several symbol intervals). Therefore, additional improvements in the performance are obtained when the channel remains constant, or almost constant, for several symbol intervals.

The present invention has application to digital communication in, for example, a Rayleigh flat fading environment using a multiple antenna system. Rayleigh fading is a type of signal fading caused by independent multipath signals having a Rayleigh PDF.

In order to set the parameters of the present invention, it is assumed that the transmitter 22 does not know the channel coefficients, and that the receiver 24 has only an estimate of them with some known estimation variance. Utilizing the Kullback-Leibler (KL) distance between conditional distributions as a performance criterion, a design criterion can be derived based on maximizing the minimum KL distance between constellation points.

A communication system 20 with M transmit antennas 26 and N receive antennas 28 in a block Rayleigh flat fading channel 30 with coherence interval of T symbol periods is modeled using the following complex baseband notation:

$$X = SH + W, \quad (1)$$

where S is the T×M matrix of transmitted signals with power constraint $$\sum_{t=1}^{T}\sum_{m=1}^{M} E\{|s_{tm}|^2\} = TP,$$

where $s_{tm}$'s are the elements of the signal matrix S, X is the T×N matrix of received signals, H is the M×N matrix of fading coefficients, and W is the T×N matrix of the additive received noise. Elements of H and W are assumed to be statistically independent, identically distributed circular complex Gaussian random variables from the distribution $C\mathcal{N}(0, 1)$. We also assume that $H = \hat{H} + \tilde{H}$, where $\hat{H}$ is known to the receiver but $\tilde{H}$ is not. Furthermore, we assume that $\tilde{H}$ has i.i.d. elements from $C\mathcal{N}(0, \sigma^2)$, and is statistically independent from $\hat{H}$ (this can be obtained, e.g., by using a least minimum mean square error estimator, or LMMSE estimator).

With the above assumptions, the conditional probability density of the received signal can be written as:

$$p(X \mid S, \hat{H}) = E_{\tilde{H}}\{p(X \mid S, \hat{H}, \tilde{H})\} = \quad (2)$$

$$\frac{\exp\{-tr[(I_T + \sigma_E^2 SS^H)^{-1}(X - S\hat{H})(X - S\hat{H})^H]\}}{\pi^{TN} \det^N(I_T + \sigma_E^2 SS^H)}.$$

Assuming a signal set of size L, $\{S_i\}_{i=1}^{L}$, and defining $p_i(X) = p(X \mid S_i, \hat{H})$, the Maximum Likelihood (ML) detector for this system will have the following form:

$$\hat{S}_{ML} = S_{\hat{i}_{ML}}, \text{ where } \hat{i}_{ML} = \arg\max_{l \in \{1, \ldots, L\}} p_l(X). \quad (3)$$

Using equation (2) above, the expected (Kullback-Leibler) KL distance between signal points $S_i$ and $S_j$ has been derived in the previously incorporated paper as $$\overline{D}(S_i \| S_j) = N tr\{(I_T + \sigma_E^2 S_i S_i^H)(I_T + \sigma_E^2 S_j S_j^H)^{-1}\} - \quad (4)$$

$$NT - N \ln\det\{(I_T + \sigma_E^2 S_i S_i^H)(I_T + \sigma_E^2 S_j S_j^H)^{-1}\} +$$

$$N \ln\det\{I_M + (1 - \sigma_E^2)(S_i - S_j)^H(I_T + \sigma_E^2 S_j S_j^H)^{-1}(S_i - S_j)\}.$$

Adopting the above KL distance as the performance criterion, the signal set design can be formulated as the following optimization problem:

$$\underset{\frac{1}{L}\sum_{l=1}^{L}\|S_l\|^2 = TP}{\text{maximize}} \min_{i \neq j} \overline{D}(S_i \| S_j), \quad (5)$$

where $$\|S_l\|^2 = \sum_{t=1}^{T}\sum_{m=1}^{M}|(S_l)_{tm}|^2$$

is the total power used to transmit $S_i$. Since the actual value of N, the number of receiver antennas 28, does not affect the maximization in equation (5), an optimal signal set can be designed assuming N=1.

For a fixed spectral efficiency, the constellation size grows exponentially with T. For example, to achieve a spectral efficiency of 4 b/s/Hz with T=5, one needs to design a constellation of $2^{20}$=1,048,576 points. With multiple antennas 26, 28 at the transmitter 22 and receiver 24, even larger spectral efficiency is expected, making the constellation design over multiple symbol intervals even more difficult, and their decoding complexity prohibitively large. For these reasons, the following discussion is limited to constellations for the case of T=1, though the concepts and equations may be extended for instances with higher T. One important factor accompanying this assumption is that each transmitted matrix will have a unit rank, and thus will not provide any transmit diversity gain. Therefore, in the absence of channel estimation errors, any transmit diversity scheme is expected to show a better performance. However, as detailed below for the case where channel estimation errors are present, the performance of the described constellations can be significantly better than transmit diversity schemes with comparable computational complexity.

Assuming T=1, each $S_i$ will be a complex row vector. The expression for the expected KL distance in equation (4) reduces to:

$$\overline{D}(c_i \| c_j) = \frac{1 + \sigma_E^2 \|S_i\|^2}{1 + \sigma_E^2 \|S_j\|^2} - 1 - \ln\left(\frac{1 + \sigma_E^2 \|S_i\|^2}{1 + \sigma_E^2 \|S_j\|^2}\right) + \quad (6)$$

-continued $$\ln\det\left(I_2 + \frac{1-\sigma_E^2}{1+\sigma_E^2\|S_j\|^2}(S_i - S_j)^H(S_i - S_j)\right)$$

Using the identity $$\det(I_M + A_{M\times N}B_{N\times M}) = \det(I_N + B_{N\times M}A_{M\times N}), \quad (7)$$

yields $$\overline{D}(c_i \| c_j) = \frac{1+\sigma_E^2\|S_i\|^2}{1+\sigma_E^2\|S_j\|^2} - 1 - \quad (8)$$

$$\ln\left(\frac{1+\sigma_E^2\|S_i\|^2}{1+\sigma_E^2\|S_j\|^2}\right) + \ln\left(1 + \frac{1-\sigma_E^2}{1+\sigma_E^2\|S_j\|^2}\|S_i - S_j\|^2\right).$$

From equation (8), it is apparent that if two constellation points (vectors) have the same norm (i.e., lie on the same M-dimensional complex sphere centered at the origin), the first three terms will cancel out, and the KL distance will be a monotonic function of the Euclidean distance between them. Therefore, considering only constant power constellations (i.e., constellations for which all of the points lie on the same sphere centered at the origin), the design criterion becomes maximizing the minimum Euclidean distance between constellation points, similar to the case of perfect channel state information (CSI) at the receiver. The design problem in this case reduces to the problem of packing points on the surface of an M-dimensional complex sphere (or 2M-dimensional real sphere).

Conversely, if two points lie on different spheres, the maximized minimum KL distance between them will happen when they lie on a line that passes through the origin, and will be determined by the radii of the two spheres. This means that if one partitions the constellation into subsets of concentric M-dimensional complex spheres, $C_1, \ldots, C_K$, with radii $r_1, \ldots, r_K$, containing $l_1, \ldots, l_K$ points, respectively, and defines the intra-subset and inter-subset distances as $$D_{intra}(i) = \min_{S_i,S_j \in C_k} \ln\left(1 + \frac{1-\sigma_E^2}{1+\sigma_E^2 r_k^2} \cdot 4r_k^2\sin^2(\angle\overline{S}_i, \overline{S}_j)\right), \text{ and} \quad (9)$$

$$D_{inter}(k, k') = \quad (10)$$

$$\frac{1+\sigma_E^2 r_k^2}{1+\sigma_E^2 r_{k'}^2} - 1 - \ln\left(\frac{1+\sigma_E^2 r_k^2}{1+\sigma_E^2 r_{k'}^2}\right) + \ln\left(1 + \frac{1-\sigma_E^2}{1+\sigma_E^2 r_{k'}^2}\cdot|r_k - r_{k'}|^2\right),$$

then the maximized minimum KL distance between the constellation points will be greater than or equal to the maximized minimum of the inter-subset and intra-subset KL distances. Signal points along the surface of the same sphere are intra-subset points. An example is any two signal points of FIG. 2A. Signal points lying on the surface of different concentric spheres are inter-subset points. An example of inter-subset points is a circular signal point and a triangular signal point of FIG. 2B. In equation (9), $\overline{S}_i$ and $\overline{S}_j$ are real vectors constructed by concatenating the real and imaginary parts of $S_i$ and $S_j$, respectively:

$$\overline{S}_i = [\Re(S_i), \Im(S_i)]^T$$

$$\overline{S}_j = [\Re(S_j), \Im(S_j)]^T, \quad (11)$$

and $\angle\overline{S}_i, \overline{S}_j$ denotes the angle between the two 2M-dimensional real vectors.

Therefore, instead of solving the (computationally complex) original optimization in equation (5), the following simplified maximin problem finds a close-to-optimal L-point multilevel constellation of 1×M vectors with average power P:

$$\underset{\substack{1\leq K\leq L, \frac{1}{L}\sum_{k=1}^K l_k r_k^2 = P, \Sigma_{k=1}^K l_k = L \\ 0\leq r_1 < r_2 < \ldots < r_K}}{\text{maximize}} \min \quad (12)$$

$$\left\{\min_{k=1,\ldots,K} D_{intra}(k), \min_{k=1,\ldots,K-1} D_{inter}(k, k+1)\right\},$$

where, without loss of generality, it is assumed that $r_1 < r_2 < \ldots < r_K$.

In equation (12), K and $l_1, \ldots, l_K$ are discrete variables, while $r_1, \ldots, r_K$ are continuous variables. For any fixed value of K and $l_1, \ldots, l_K$ satisfying the specified constraints, equation (12) reduces to a continuous optimization over $r_1, \ldots, r_K$, which can be solved numerically. Even though K is allowed to range from 1 to L in equation (12), a pragmatic solution need not evaluate every possible value for K. Starting from K=1, and increasing the value of K by one each time, we can stop the search once the optimum minimum distance of the solution stops increasing. Moreover, since the intra-subset distance is an increasing function of $r_k$, the optimum constellation also satisfies the extra constraint $l_1 < l_2 < \ldots < l_K$. This extra constraint can be used to further restrict the domain of the search.

As noted above, the design problem for each subset is equivalent to a packing problem on the surface of an M-dimensional complex (2M-dimensional real) sphere. However, since the design and decoding complexities of a maximum packing solution are usually high, a more structured solution for a MIMO communication system is a recursive structure for these spherical constellations which have systematic design and low complexity decoding algorithms.

As an initial matter, let $S_n(L)$ denote the L-point recursively constructed n-dimensional real spherical constellation. Beginning from n=2:

$$S_2(L) = \left\{\begin{bmatrix}\cos((l-1)2\pi/L)\\ \sin((l-1)2\pi/L)\end{bmatrix}\right\}_{l=1}^L. \quad (13)$$

For n>2, the constellation is constructed by using a number of (n−1)-dimensional recursive sub-constellations as latitudes of the n-dimensional constellation. An example of this procedure for the case of n=3 is detailed below.

Figure 2A:
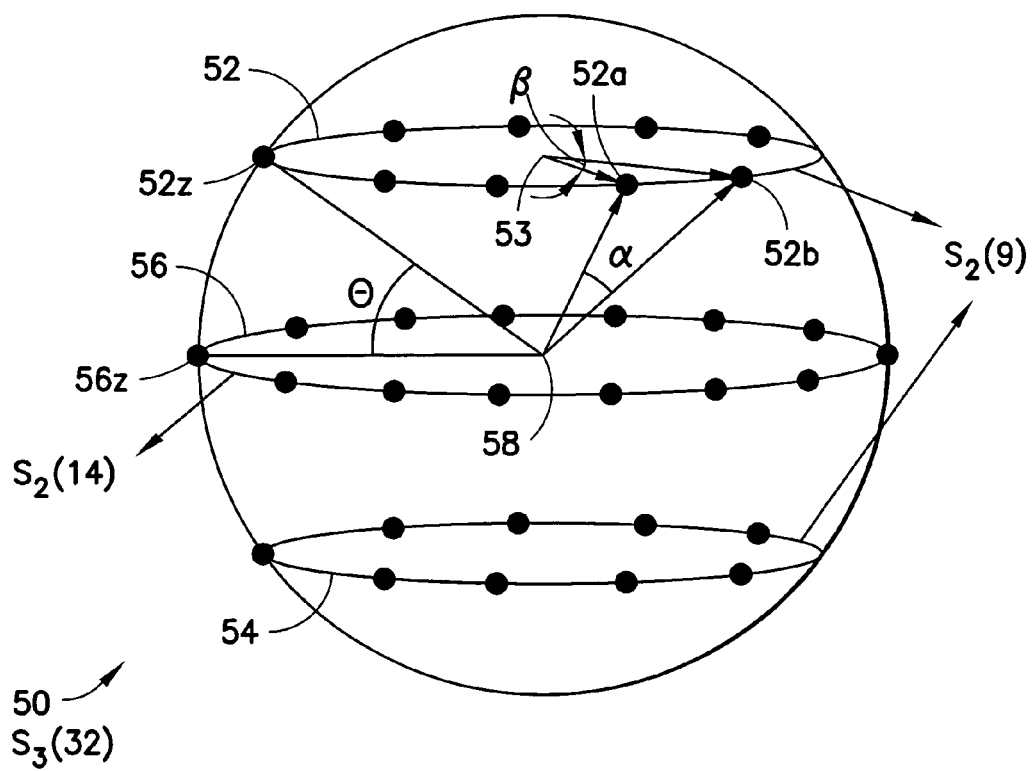
FIG. 2A is a diagram of a three level, three-dimensional spherical constellation according to the preferred embodiment of the present invention.
Figure 2B:
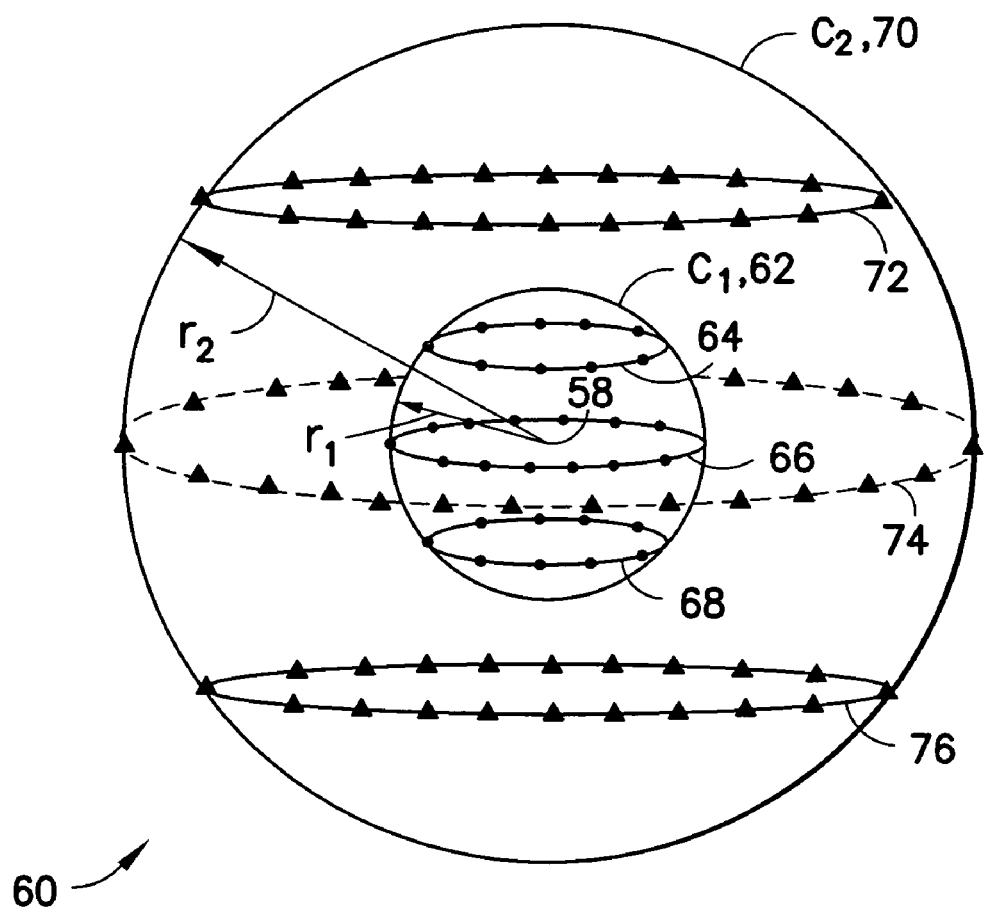
FIG. 2B is a diagram similar to FIG. 2A but showing two concentric spheres or subsets of constellation points.

FIG. 2A shows a 32-point three-dimensional constellation 50. FIGS. 2A and 2B are presented to better describe a recursive construction method described herein. The actual signal constellations derived herein as an illustration (whose performance curves are reproduced at FIGS. 3-8 and described below) are four dimensional (real dimensions) because they reflect a MIMO system with two transmit antennas (M=2), and each transmit antenna requires one complex dimension which is equivalent to two real dimensions. As detailed above, constellations may be designed for any integer M, resulting in a 2M real-dimensioned constellation (an M complex-dimensioned constellation).

The constellation 50 of FIG. 2A defines three sub-constellations 52, 54, 56, each disposed in a plane and along a circle circumscribing the surface of the constellation 50. The sub-constellations 52, 54 [$S_2(9)$] nearest the poles of the constellation 50 each define nine discrete points, discrete meaning no points in common. The larger sub-constellation 54 [$S_2(14)$] along the equator of the constellation 50 defines fourteen points. All sub-constellations are discrete respecting all other sub-constellations.

The minimum angle between points in a sub-constellation taken in isolation, such as the points 52a and 52b of the sub-constellation 52, is denoted by $\beta$, respecting the geometric center 53 of the sub-constellation 52. However, when a sub-constellation 52 is used as one level of a multi-level constellation 50 as in FIG. 2A, the effective angle between the constellation points 32a, 32b is no longer $\beta$. With respect to the origin 58 of the constellation 50, the effective minimum angle between points of a sub-constellation 52, 54, 56, $\alpha$, (i.e., between points on one level) is given by the following equation:

$$\sin\left(\frac{\alpha}{2}\right) = \cos(\theta)\sin\left(\frac{\beta}{2}\right). \quad (14)$$

where $\theta$ is the latitude of the sub-constellation as shown in FIG. 2A.

FIG. 2B depicts a constellation 60 with signal points along the surfaces of K=2 concentric spheres, each sphere being a subset of the entire constellation 60. An inner sphere or inner subset 62 is termed $C_1$ and each point on its surface also lies within one of three sub-constellations 64, 66, 68 of that inner subset 62. Each of the sub-constellations 64, 66, 68 of the inner subset 62 is depicted as a circle spaced along one of P=3 latitudes or levels at a distance $r_1$ from the origin 58. Similarly, an outer sphere or outer subset 70 is termed $C_2$ and each point on its surface also lies within one of three sub-constellations 72, 74, 76 of that outer subset 70. Each of the sub-constellations 72, 74, 76 of the outer subset 70 is depicted as a triangle spaced along one of P=3 latitudes or levels at a distance $r_2$ from the origin 58. The central sub-constellation 74 of the outer sphere $C_2$ (outer subset 70) is shown in broken line and not visible through the inner sphere $C_1$ (inner subset 62) for clarity.

Assuming a spherical constellation (or one of the spherical subsets of a multi spherical constellation) of P levels (sub-constellations), the intra-level and inter-level distances (i.e., the distance between points of the same sub-constellation and the distance between points of disparate sub-constellations, respectively) are defined by the following:

$$d_{intra}(p) = \sin^2(\alpha_p), \text{ for } p=1,\ldots,P, \quad (15)$$

and $$d_{inter}(p,p') = \sin^2(\theta_p - \theta_{p'}), \text{ for } p,p'=1,\ldots,P, \quad (16)$$

where $\alpha_p$ is the effective minimum intra-level angle of the $p^{th}$ sub-constellation, and $\theta_p$ and $\theta_{p'}$ are the latitudes of the sub-constellations p and p', respectively. FIG. 2A depicts graphically the angle $\alpha$ between two adjacent points 52a, 52b of one sub-constellation 52; and the angle $\theta$ between two points 52z, 56z.

Similar to the approach above, the optimization problem is simplified by only maximizing the minimum of the intra-level and inter-level distances, instead of maximizing the minimum distance between all pairs of constellation points. The following optimization problem gives that solution:

$$\underset{1 \leq P \leq L, \sum_{p=1}^{P} l_p = L, -\frac{\pi}{2} \leq \theta_1 < \cdots < \theta_P \leq \frac{\pi}{2}}{\text{maximize}} \min \quad (17)$$

$$\left\{\min_{p=1,\ldots,P} d_{intra}(p), \min_{p=1,\ldots,P-1} d_{inter}(p, p+1)\right\},$$

where $l_p$ denotes the number of the points in the $p^{th}$ level or $p^{th}$ sub-constellation.

Similar to the optimization above, here P and $l_1, \ldots, l_P$ are discrete variables, whereas $\theta_1, \ldots, \theta_P$ are continuous variables. For a given choice of P and $l_1, \ldots, l_P$ satisfying the specified constraints, the optimal values for $\theta_1, \ldots, \theta_P$ are found by numerically solving a continuous optimization problem. All of the possible values for P need not be attempted. Starting from P=1 and increasing the value of P by one at each time, the search can be stopped once the optimum minimum distance obtained from the above optimizations stops increasing. Also it can be shown that the optimal values for $l_1, \ldots, l_P$ satisfy the following extra constraint:

$$l_p \geq l_{p-1} \text{ or } l_p \geq l_{p+1}, \text{ for } p=2,\ldots,P-1. \quad (18)$$

This extra constraint can be used to further restrict the search domain.

For the case of n>3, the same procedure as explained above is used, with the difference that instead of $S_2$ constellations, $S_{n-1}$ constellations are used as the sub-constellations, and the spherical subsets (64, 70 of FIG. 2B) of the constellations, if any, are constructed recursively.

Simulations were conducted with two different spectral efficiencies of 4 and 8 b/s/Hz. Partially coherent constellations were designed for a 2×2 (two-transmit and two-receive antenna) system, and different values of channel estimation variance (1%, 5%, and 10%) were evaluated. Performance of the partially coherent constellations designed in accordance with the above teachings was plotted against other known constellations. Specifically, two independent QPSK or 16QAM constellations were used for the two transmit antennas (resulting in spectral efficiencies of 4 and 8 b/s/Hz, respectively) and plotted as reference curves. These are similar to a V-BLAST scheme (see G. J. Foschini, LAYERED SPACE-TIME ARCHITECTURE FOR WIRELESS COMMUNICATION IN A FADING ENVIRONMENT WHEN USING MULTIPLE ANTENNAS, *Bell Labs Tech. J.*, vol. 1, no. 2, pp. 41-59, 1996), with the difference that the optimal (ML) detector, and not a linear or successive receiver as suggested in the VBLAST scheme, was used for the results reproduced herein in order to have a fair comparison. These results are plotted in FIGS. 3-6 as "PSK" and in FIGS. 7 and 8 as QAM.

To compare the proposed schemes with a transmit diversity scheme, the orthogonal transmit diversity scheme of S. M. Alamouti (see A SIMPLE TRANSMIT DIVERSITY TECHNIQUE FOR WIRELESS COMMUNICATIONS, *IEEE Journal on Selected Areas of Communications*, vol. 16, no. 8, pp. 1451-1458, October, 1998) was also considered. This diversity scheme has a similar decoding complexity as the one described above, and its performance for a 2×2 system with 16QAM and 256QAM constellations (4 and 8 b/s/Hz) was evaluated through simulation. These results are plotted in FIGS. 3-8 as "Alamouti-QAM" and for brevity are referred to as the Alamouti scheme.

Figure 3:
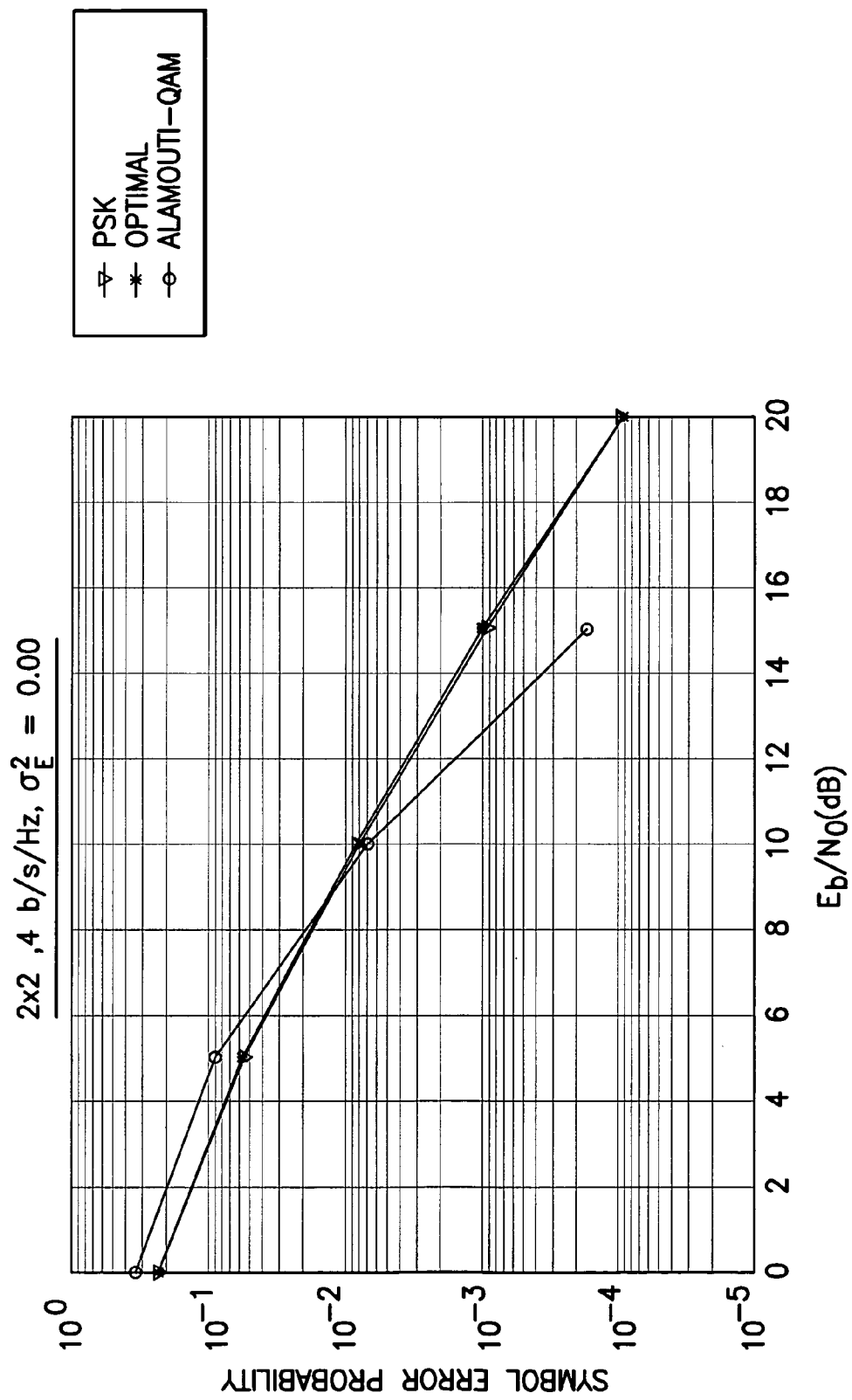
FIG. 3 is a graph comparing symbol error rate for several constellations for 4 b/s/Hz, with M=N=2 and $\sigma_E^2$=0.0.
Figure 4:
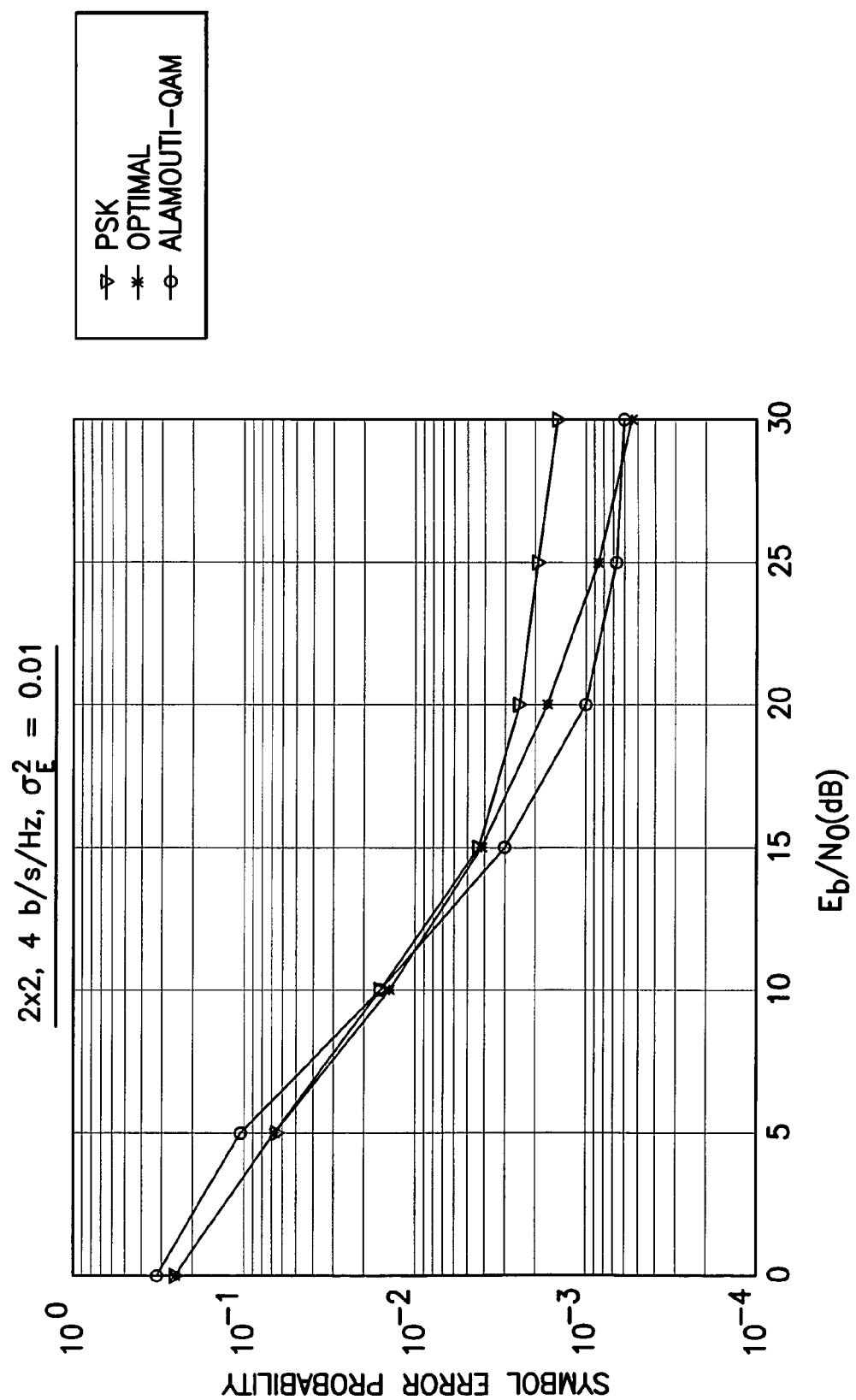
FIG. 4 is a graph similar to FIG. 3 but where $\sigma_E^2$=0.01.

FIGS. 3-4 shows the symbol error rate curves for the case of 4 b/s/Hz and estimation variances of 0% (FIG. 3) and 1% (FIG. 4). In the absence of estimation error (FIG. 3), the QPSK and the optimal two-antenna constellations have almost the same performance. Because of higher order of transmit diversity, at high SNR, the Alamouti scheme in this case shows better performance compared to both QPSK and the optimal two-antenna constellations.

With 1% estimation variance (FIG. 4), the new constellations according to the present invention start showing consistently better performance for SNR values larger than 15 dB. The Alamouti scheme suffers from performance degradation at high SNR, and crosses the curve of the new constellations at around 30 dB.

Figure 5:
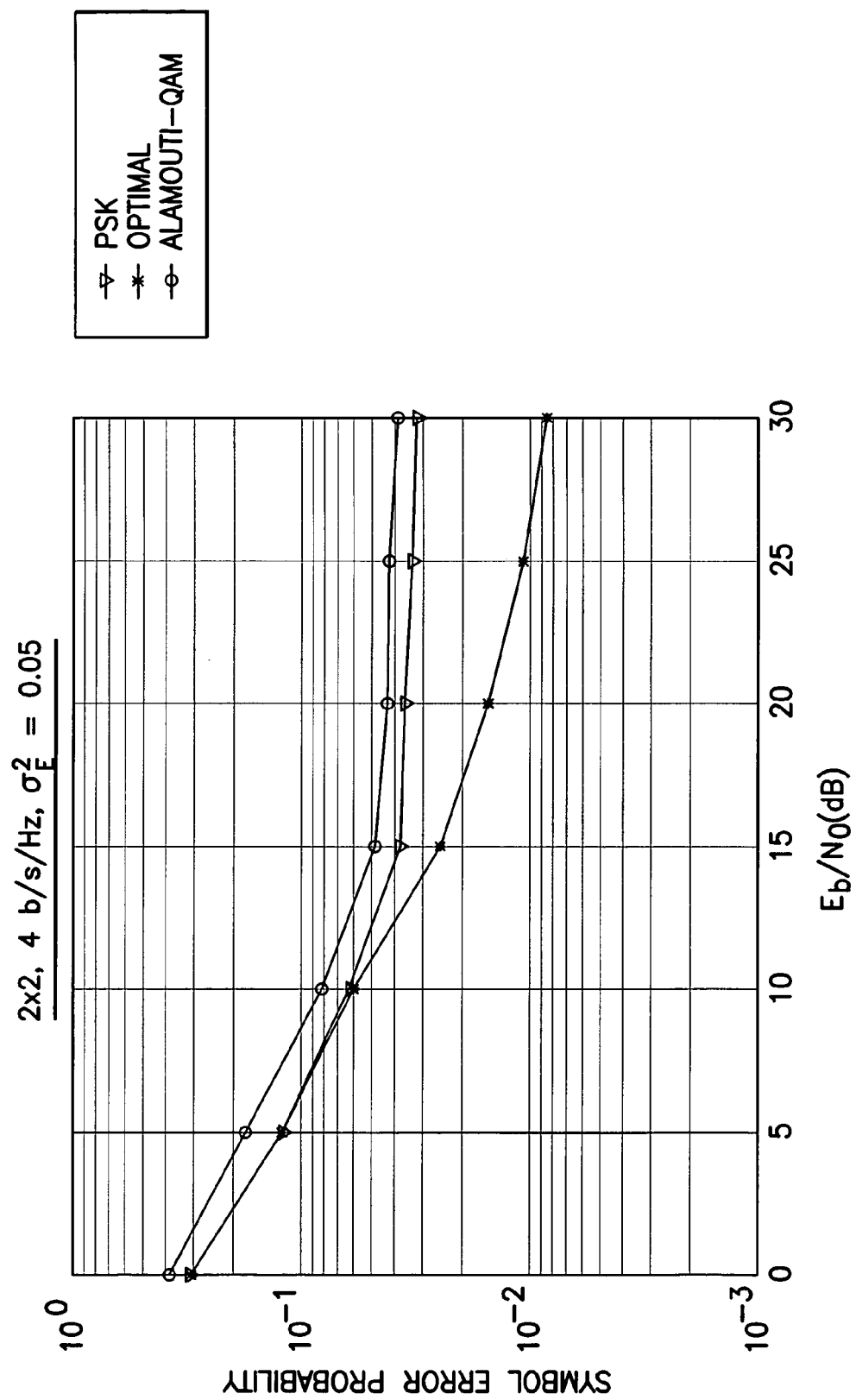
FIG. 5 is a graph similar to FIG. 3 but where $\sigma_E^2$=0.05.
Figure 6:
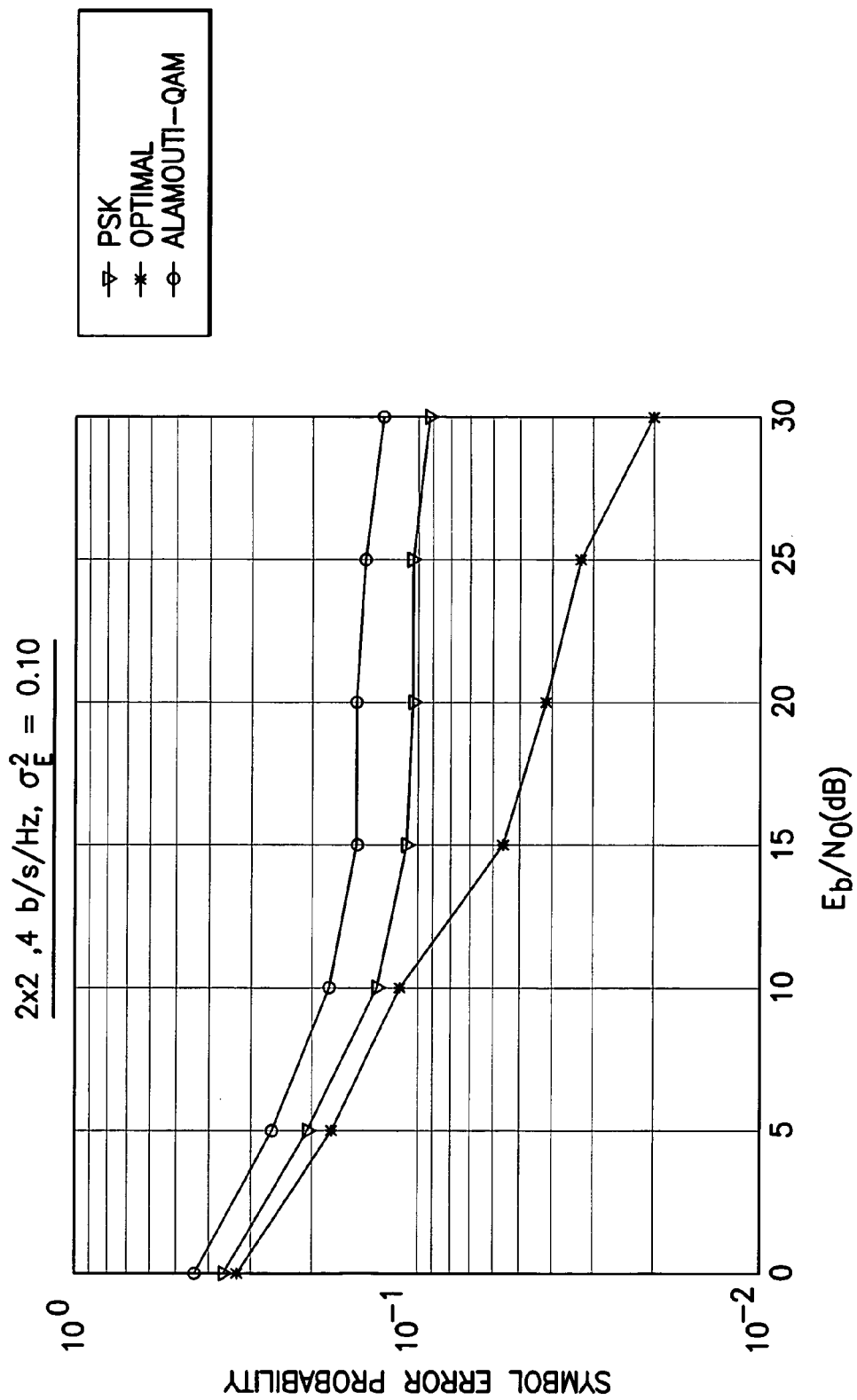
FIG. 6 is a graph similar to FIG. 3 but where $\sigma_E^2$=0.10.

FIGS. 5-6 shows the symbol error rate curves for the case of 4 b/s/Hz and estimation variances of 5% (FIG. 5) and 10% (FIG. 6). The performance improvement with the new constellations of the present invention is substantial in these cases. The Alamouti scheme suffers from a severe performance degradation because of channel estimation error, and its performance becomes even worse than the conventional QPSK constellations without any transmit diversity.

Figure 7:
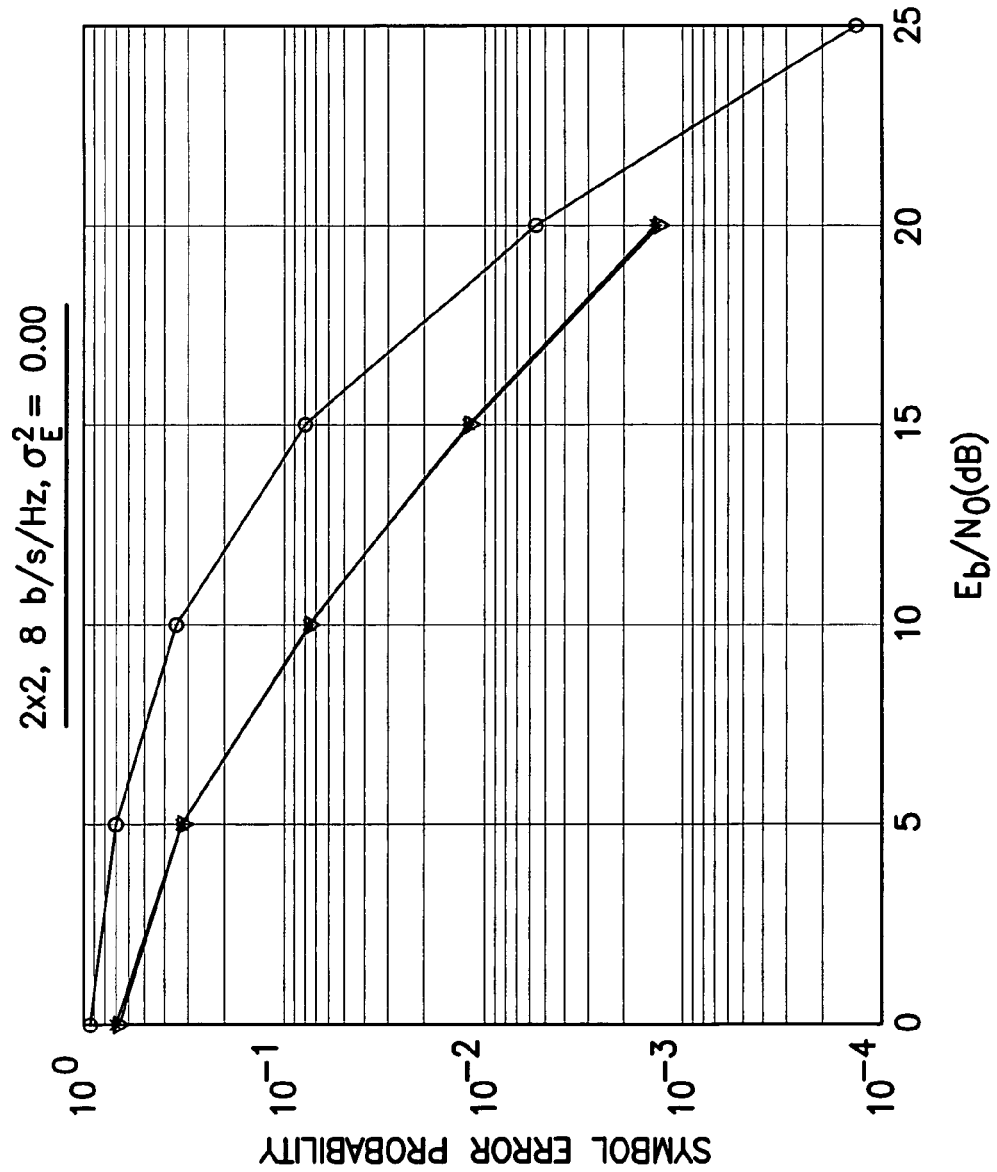
FIG. 7 is a graph comparing symbol error rate for several constellations for 8 b/s/Hz, with M=N=2 and $\sigma_E^2$=0.0.
Figure 8:
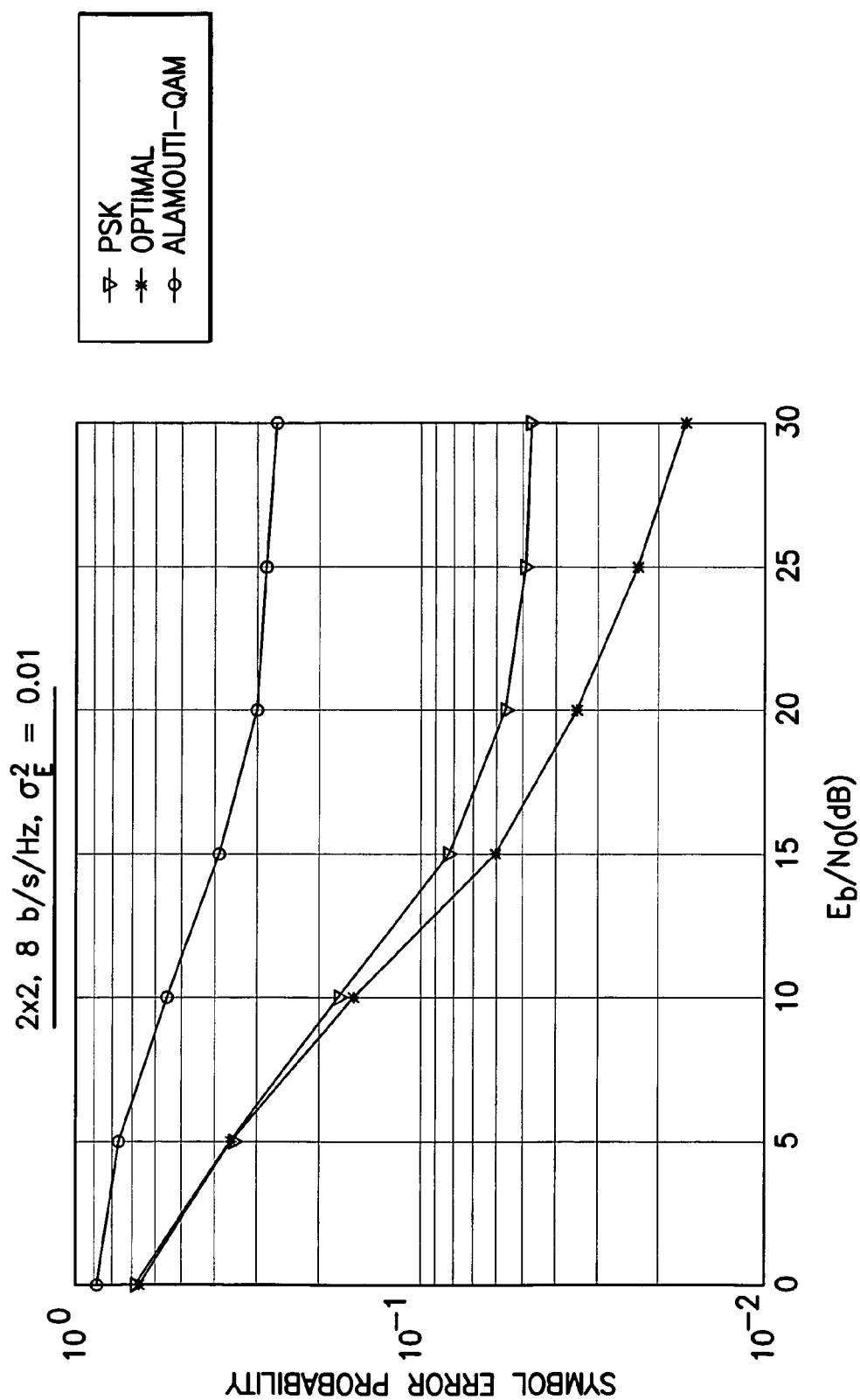
FIG. 8 is a graph similar to FIG. 7 but where $\sigma_E^2$=0.01.

FIGS. 7-8 show the symbol error rate curves for the case of 8 b/s/Hz and estimation variances of 0% (FIG. 7) and 1% (FIG. 8). In the absence of estimation error (FIG. 7), the 16QAM and the optimal two-antenna constellations have almost the same performance. Though the Alamouti scheme has a larger transmit diversity advantage (indicated by a larger slope in FIG. 7), it performs worse than the conventional 16QAM constellations because of smaller coding advantage for SNR values of up to around 23 dB.

With 1% estimation variance (FIG. 8), the new constellations of the present invention show significant performance improvement compared to the 16QAM constellations. The Alamouti scheme suffers from a severe performance degradation and reaches an error floor of about $3\times10^{-1}$.

Consider again the receiver 24 of FIG. 1, that includes a detector 34. Inputs to the detector 34 include the received signal, a channel estimate from the channel estimators 38a, ... 38n, and also possibly the signal to noise ratio (SNR, typically $E_b/N_0$ for digital signals), some statistic of estimation error, such as variance, $\sigma_E^2$, and a signal constellation 50, 60 such as that of FIG. 2A or 2B that was previously constructed in accordance with this invention, to include amplitude encoded information based on a fading channel that exploits the statistics of the fading process and the channel estimation error. An output of the detector 34 is a stream of detected symbols. The constellation input may be selected from one of x stored constellations, where x may have a value (typically) in the range of about three to about four representing 3-4 SNR ranges. Each constellation may comprise from a few to several hundred points.

The transmitter 22 of FIG. 1 takes a bit stream that is inputted, selects a constellation based on the current SNR from the group of x stored constellations, converts input bits into points from the selected constellation, and modulates the carrier in phase and amplitude, in accordance with the selected constellation point. A symbol corresponding to the inputted bits is transmitted over the channels 30. The current SNR may be made known to the transmitter 22 based on the operation of a power control sub-system, and can be indicated by the receiver 24 through a feedback power control channel. A signal constellation may also be chosen based on the number of transmit antennas M used to send the received signal. The number M may be determined by a header in the received message, by signal processing of characteristics of the received message within the receiver itself, or by other means known in the art. The receiver may select the proper constellation based on pre-programmed logic directing a particular constellation for use with various values of SNR, or by other means known in the art for matching one of several decoding options to a characteristic or quality of the received signal.

At the receiver 24, a symbol is received from the transmitter 22, a constellation is selected from a group of x stored constellations based at least on the current SNR, and the carrier is demodulated, preferably by Maximum Likelihood (ML) demodulation, based on the selected constellation. Hard symbols or soft bits are output, depending on whether the received symbols coded or uncoded.

The constellations used in the present invention may, for example, be implemented as lookup tables in either the transmitter unit 22 and/or the receiver unit 24. Symbol decoding (detection) can be done in two stages of "point in sub-constellation decoding" and "sub-constellation decoding", similar to trellis coded modulation schemes. That is, given the received signal, the point with the largest likelihood (i.e., the point closest to the received signal) within each sub-constellation is found first (point in sub-constellation decoding). Next, the likelihoods of the best points in different sub-constellations are compared to one another to determine the point having the largest likelihood (sub-constellation decoding). For constellations defining more than one spherical subset, the above two-stage decoding can be iterated for each spherical subset, yielding a three-stage decoding process.

Thus for digital communication in a Rayleigh flat fading environment using a MIMO system, when only partial (imperfect) channel state information is available at the receiver, a partially coherent constellation design based on the Kullback-Leibler distance between distributions has been shown to achieve significant performance gains over the conventional constellations and transmit diversity schemes with comparable complexity.

As used herein, an arcuate surface is a three dimensional curved surface, such as a sphere, an egg, a saddle surface, etc. While non-spherical constellations (or subsets of constellations) may be derived from the teachings herein, retaining a spherical structure allows the KL distance between points of the same spherical subset [put forth in equation (9)] to become a monotonic function of the Euclidean distances between points, rendering constellation design independent from the radius of the spherical subset of the overall constellation. As such, various spherical subsets of points can be designed regardless of radius (using r=1, for example), each spherical subset defining a different number of constellation points. These subsets can be stored, such as in the form of lookup tables, and accessed, assembled, and scaled to reflect a particular SNR for the current transmission or reception. The concentric subsets and sub-constellations of each subset are assembled by optimizing the number of levels (sub-constellations), the number of points in each level, and the radius of each level. So long as the subsets are spherical, the optimization problem is greatly simplified as described herein.

While the maximized minimum KL distance between points within a single spherical subset reduces to a maximized minimum Euclidean distance for a spherical constellation, the distance between points of different subsets remains a maximized minimum KL distance, whether or not the subsets are spherical and/or concentric. Equation (10) may be used to optimize the KL distance between such points. Mathematically, no physical structure need be imposed on constellations according to the present invention; the spherical diagrams are for clarity of explanation and to simplify optimization. However, structure greatly simplifies computational complexity, and the multi-level, multi-spherical recursive structure described herein maximally reduces the complexity of constellation optimization.

While described in the context of presently preferred embodiments, those skilled in the art should appreciate that various modifications of and alterations to the foregoing embodiments can be made, and that all such modifications and alterations remain within the scope of this invention. Examples herein are stipulated as illustrative and not exhaustive. As used herein, the term n-dimensional real constellation shall refer to a constellation in n real dimensions, as opposed to complex dimensions.

What is claimed is:

1. A method for transmitting a signal comprising:
inputting a bit stream;
selecting a signal constellation from a plurality of stored signal constellations, the selected signal constellation including a plurality of constellation points selected by maximizing a minimum Kullback-Leibler distance between the plurality of constellation points;
converting the input bit stream to symbols based on the selected signal constellation to encode the input bit stream in an amplitude of the symbols;
modulating a carrier wave in phase and amplitude in accordance with the symbols; and
transmitting the modulated carrier wave over a wireless channel;
wherein said selecting a signal constellation from a plurality of stored signal constellations is based on an indication of a number of transmit antennas used in transmitting the modulated carrier wave.

2. The method of claim 1, further comprising determining a characteristic of the wireless channel, wherein said selecting a signal constellation from a plurality of stored signal constellations is based on the determined characteristic.

3. The method of claim 2, wherein the characteristic comprises a signal to noise ratio.

4. The method of claim 2, wherein the characteristic is determined from a signal received over the wireless channel.

5. The method of claim 1, wherein the number of transmit antennas used in the transmitting is greater than one.

6. The method of claim 5, wherein the number of transmit antennas is included in a header of the message.

7. The method of claim 1, wherein the selected signal constellation comprises a plurality of sub-constellations.

8. The method of claim 7, wherein the plurality of sub-constellations comprise a plurality of points located on a surface of a plurality of concentric spheres.

9. The method of claim 7, wherein the plurality of sub-constellations comprise a plurality of points located at a plurality of latitudes on a surface of a sphere.

10. The method of claim 9, wherein the plurality of sub-constellations further comprise a second plurality of points located on a second surface of a second sphere concentric with the sphere.

11. The method of claim 7, wherein selecting the plurality of constellation points by maximizing a minimum Kullback-Leibler distance between the plurality of constellation points comprises maximizing a first minimum Kullback-Leibler distance between the plurality of sub-constellations and a second minimum Kullback-Leibler distance between a plurality of points of each sub-constellation.

12. The method of claim 1, wherein the plurality of stored signal constellations is stored as at least one of a look-up table or an algorithm.

13. A device comprising:
a transmitter;
at least one antenna coupled to the transmitter for transmitting a signal over a wireless channel;
a processor, coupled to the transmitter;
a computer-readable medium including computer-readable instructions stored therein that, upon execution by the processor, perform operations comprising
selecting a signal constellation from a plurality of stored signal constellations based on an indication of a quantity of the at least one antenna, the selected signal constellation including a plurality of constellation points selected by maximizing a minimum Kullback-Leibler distance between the plurality of constellation points; and
converting the input bit stream to symbols based on the selected signal constellation to encode the input bit stream in an amplitude of the symbols; and
a modulator having an input coupled to an output of the processor and an output coupled to the antenna, the modulator configured to modulate a carrier wave in phase and amplitude in accordance with the symbols.

14. The device of claim 13, wherein the computer-readable medium further includes computer-readable instructions stored therein that, upon execution by the processor, perform operations comprising determining a characteristic of the wireless channel.

15. The device of claim 14, wherein the characteristic comprises a signal to noise ratio.

16. The device of claim 14, further comprising a receiver, wherein the characteristic is determined from a signal received over the wireless channel at the receiver.

17. The device of claim 13, wherein the at least one antenna comprises a plurality of transmit antennas.

18. The device of claim 17, wherein the number of the plurality of transmit antennas used in transmitting the signal is greater than one, and is determined from a message received over the wireless channel.

19. The device of claim 18, wherein the number of the plurality of transmit antennas is included in a header of the message.

20. The device of claim 13, wherein the selected signal constellation comprises a plurality of sub-constellations.

21. The device of claim 20, wherein the plurality of sub-constellations comprise a plurality of points located on a surface of a plurality of concentric spheres.

22. The device of claim 20, wherein the plurality of sub-constellations comprise a plurality of points located at a plurality of latitudes on a surface of a sphere.

23. The device of claim 22, wherein the plurality of sub-constellations further comprise a second plurality of points located on a second surface of a second sphere concentric with the sphere.

24. The device of claim 20, wherein selecting the plurality of constellation points by maximizing a minimum Kullback-Leibler distance between the plurality of constellation points comprises maximizing a first minimum Kullback-Leibler distance between the plurality of sub-constellations and a second minimum Kullback-Leibler distance between a plurality of points of each sub-constellation.

25. The device of claim 13, wherein the plurality of stored signal constellations is stored as at least one of a look-up table or an algorithm.

26. A computer program product of computer-readable instructions, tangibly embodied on a non-transitory computer-readable medium and executable by a digital data processor to perform actions directed toward transmitting a signal, the computer-readable instructions configured to cause a device to:
select a signal constellation from a plurality of stored signal constellations, the selected signal constellation including a plurality of constellation points selected by maximizing a minimum Kullback-Leibler distance between the plurality of constellation points;

converting an input bit stream to symbols based on the selected signal constellation to encode the input bit stream in an amplitude of the symbols;

modulating a carrier wave in phase and amplitude in accordance with the symbols; and transmitting the modulated carrier wave over a wireless channel;

wherein said selecting a signal constellation from a plurality of stored signal constellations is based on an indication of a number of transmit antennas used in transmitting the modulated carrier wave.

27. The computer program product of claim 26, wherein the computer-readable instructions are further configured to cause a device to determine a characteristic of the wireless channel.

28. The computer program product of claim 27, wherein the characteristic comprises a signal to noise ratio.

29. The computer program product of claim 26, wherein the selected signal constellation comprises a plurality of sub-constellations.

30. The computer program product of claim 29, wherein the plurality of sub-constellations comprise a plurality of points located on a surface of a plurality of concentric spheres.

31. The computer program product of claim 29, wherein the plurality of sub-constellations comprise a plurality of points located at a plurality of latitudes on a surface of a sphere.

32. The computer program program of claim 31, wherein the plurality of sub-constellations further comprise a second plurality of points located on a second surface of a second sphere concentric with the sphere.

33. The computer program product of claim 29, wherein selecting the plurality of constellation points by maximizing a minimum Kullback-Leibler distance between the plurality of constellation points comprises maximizing a first minimum Kullback-Leibler distance between the plurality of sub-constellations and a second minimum Kullback-Leibler distance between a plurality of points of each sub-constellation.

34. The computer program product of claim 26, wherein the plurality of stored signal constellations is stored as at least one of a look-up table or an algorithm.

* * * * *

UNITED STATES PATENT AND TRADEMARK OFFICE
CERTIFICATE OF CORRECTION

PATENT NO. : 7,889,804 B2
APPLICATION NO. : 10/671346
DATED : February 15, 2011
INVENTOR(S) : Borran et al.

It is certified that error appears in the above-identified patent and that said Letters Patent is hereby corrected as shown below:

On Title Page 2, item (56), under "Other Publications", in Column 1, Line 5, delete "Archieve" and insert -- Archive --.

On Title Page 2, item (56), under "Other Publications", in Column 1, Line 13, delete "Anetenna" and insert -- Antenna --.

On Title Page 2, item (56), under "Other Publications", in Column 2, Line 26, delete "Atalanta," and insert -- Atlanta, --.

On Title Page 2, item (56), under "Other Publications", in Column 2, Line 28, delete "07/7803" and insert -- 0-7803 --.

Column 15, line 67, in Claim 13, delete "comprising" and insert -- comprising: --.

Column 18, line 5, in Claim 32, delete "program program" and insert -- program product --.

Signed and Sealed this
Twenty-eighth Day of June, 2011

David J. Kappos
*Director of the United States Patent and Trademark Office*